S. Stone.

Metallic Bar.

No. 95,746. Patented Oct. 12, 1869.

Witnesses;
N. C. Wilder
Jeremy W. Bliss

Inventor;
Samuel Stone

United States Patent Office.

SAMUEL STONE, OF NORTH MANCHESTER, CONNECTICUT.

Letters Patent No. 95,746, dated October 12, 1869.

IMPROVED METALLIC BAR.

The Schedule referred to in these Letters Patent and making part of the same.

*To all whom it may concern:*

Be it known that I, SAMUEL STONE, of North Manchester, county of Hartford, and State of Connecticut, have invented a certain new and useful Improvement in the Manufacture of Iron Bars having steel cores or centres; and to enable others skilled in the art to manufacture the same, I will proceed to describe the *modus operandi* thereof, referring to the drawings, in which the same letters indicate like parts in each of the figures.

The nature of this invention consists in uniting two bars of metal together over a rod of steel, thereby producing a rod or bar of iron, having a steel centre or core through its entire length.

In the accompanying drawings—

Figure 1:
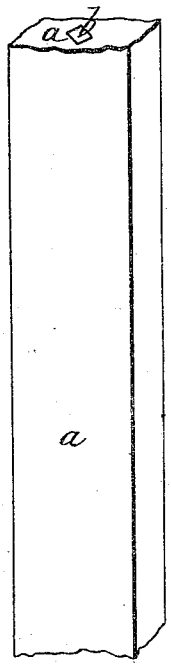
Figure 1 represents a bar of iron having a steel centre.
Figure 2:
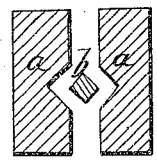
Figure 2 is an end view, showing the end shape of the two bars before being welded or otherwise firmly united together, and the end of the steel bar or centre bar between them.

*a a* are bars of iron, as formed before being welded together over or upon the steel bar.

*b* is the steel bar or core.

The bars *a a* are first formed into the required shape, as shown, by means of roller-dies, substantially such as are in common use for rolling and drawing iron, so that when two of these bars are put together over a central steel bar, *b*, and welded together, a solid bar, having a steel core or centre, will be produced, extending through its entire length.

This process is effected by first encasing, between two iron plates or bars, *a a*, a steel rod or bar, *b*, then heating and welding them together by the common process of welding, and then drawing the bar so formed into any required shape, as square, six-square, or eight-square, and when thus produced, is rendered applicable and useful for various purposes, as for set-screws, prick-punches, self-sharpening horseshoe-calks, &c.

I believe I have thus shown the nature and *modus operandi*, so as to enable others skilled in the art to practise the same therefrom.

What I claim, and desire to secure by Letters Patent, is—

As an improved article of manufacture, a bar of iron, having a centre core of steel through its entire length, substantially as shown and set forth.

SAMUEL STONE. [L. S.]

Witnesses:
N. C. WILDER,
JEREMY W. BLISS.